(12) United States Patent
Ionov et al.

(10) Patent No.: US 6,317,537 B1
(45) Date of Patent: Nov. 13, 2001

(54) LAUNCH PORT FOR PUMPING FIBER LASERS AND AMPLIFIERS

(75) Inventors: Stanislav I. Ionov, Calabasas; William C. Boling, Los Angeles, both of CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 09/632,112

(22) Filed: Aug. 3, 2000

(51) Int. Cl.[7] ............................... G02B 6/26; G02B 6/42
(52) U.S. Cl. ................................... 385/32; 372/6
(58) Field of Search ............................. 385/31, 27, 32, 385/33, 147, 39, 130, 131, 14, 15, 17, 901; 372/6, 20, 92, 94, 102

(56) References Cited

U.S. PATENT DOCUMENTS

| | | | |
|---|---|---|---|
| 6,167,169 | * 12/2000 | Brinkman et al. | 385/4 |
| 6,229,939 | * 5/2001 | Komine | 385/29 |
| 6,243,517 | * 6/2001 | Deacon | 385/50 |

FOREIGN PATENT DOCUMENTS

96/20519   7/1996  (WO) .

* cited by examiner

Primary Examiner—Akm E. Ullah
(74) Attorney, Agent, or Firm—Ladas & Parry

(57) ABSTRACT

A method and apparatus for coupling substantial optical power into an optical fiber from the side without encumbering ends of the fiber. A special optical fiber, having a gain medium preferably including rare earth dopants in the core, is provided. One or more launch sections are selected at intervals along the special fiber with absorptive loops therebetween. The launch sections are stripped to their inner cladding layer, which preferably has a rectangular cross section, and positioned adjacent each other to form a launch region having a convex side mated to a launch port shaped to conform thereto, and with a low refraction index material contacting the corresponding concave side of the launch region. The concave side is preferably supported by an upwardly convex support block. Pump light is directed by appropriate optics into one or more faces of a launch port, which has a refractive index substantially matching that of the inner cladding layer into which it transmits the pump light. The pump light entering each face is preferably provided by one or more stripe diodes about as long as the total width of the adjacent launch sections in the launch region, and may include combined light from a plurality of sources. As the pump light travels along the special fiber in the absorptive loops between the launch sections, it is significantly absorbed by the gain medium of the optical fiber and thereby contributes optical energy to generate or amplify light in the core. The launch port faces may reflect unabsorbed light back into the special fiber, even while transmitting pump light at a different wavelength into the launch port.

37 Claims, 5 Drawing Sheets

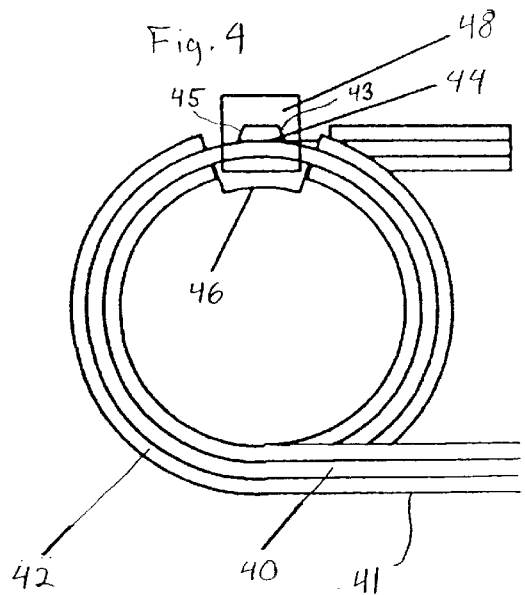
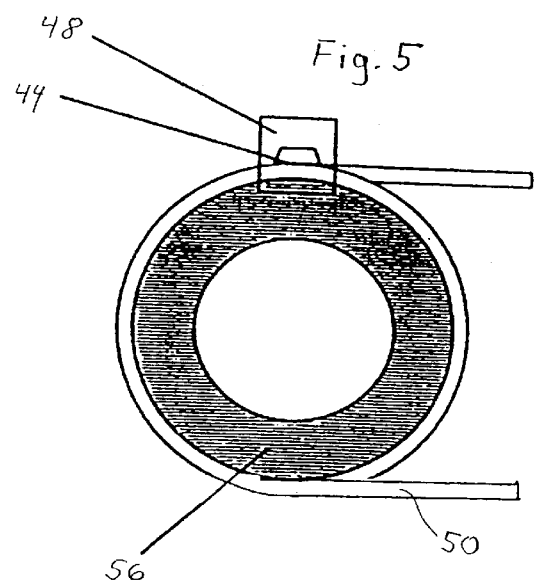
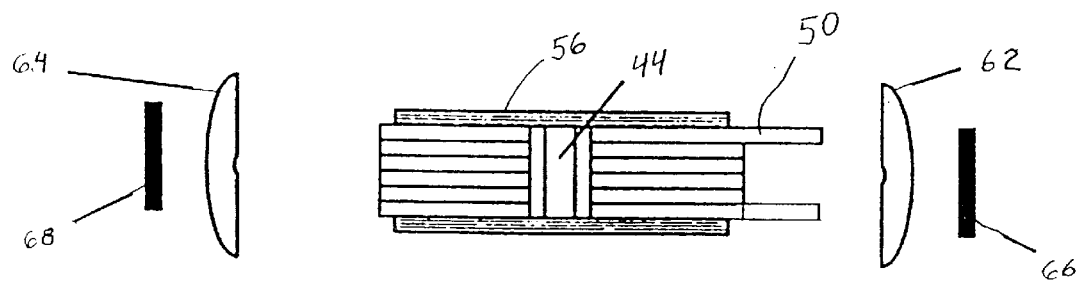

LAUNCH PORT FOR PUMPING FIBER LASERS AND AMPLIFIERS

FIELD OF THE INVENTION

This invention relates to the field of fiber optics, more particularly to the field of pumping optical fibers to generate or increase output power from fiber optic based devices, and specifically to mechanisms for launching light for pumping into optical fibers.

BACKGROUND

In the field of fiber optic systems, fiber optic guides transmit light power from a light source to a utilization device. Referring to FIG. 1, light source 10 transmits light signal $P_S$ 11 at wavelength $\lambda_S$ through fiber 12 to utilization device 14. Couplings between light source 10, utilization device 14 and fiber 12 are well known in the art and are not shown. Fiber 12 includes core 16, cladding 18 and protective covering 20. Light source 10 typically provides the optical signals carrying information which propagates in the core. This fiber is considered a single-clad fiber. There are also double-clad fibers. A double-clad fiber has a core, a first cladding, a second cladding and the protective coating. In the double-clad case, while a single-mode signal can propagate in the core, a multi-mode signal can be coupled into the inner cladding, whereupon the inner cladding acts as a core for the second cladding.

Numerous applications require the generation or amplification of optical signals. Fiber optics systems used in a large variety of commercial and military applications, such as in telecommunications, inter-satellite optical communications, and for missile radar tracking systems, require generation and amplification of optical signals.

Fiber optic guides ("fibers") typically have at least two essential parts. One part is the core where light propagates. The other part is cladding surrounding the core which creates conditions whereby the light propagates only in the core. These fibers are capable of transmitting single mode optical signals in the core without amplification, and produce a small amount of background loss. These can be considered "regular" fibers.

"Special" fibers providing a gain medium typically include a core doped with rare earth atoms such as erbium (Er), ytterbium (Yb), erbium-ytterbium (ErYb), neodymium (Nd), thulium (Tm), etc., and are utilized in applications requiring the generation or amplification of optical signals. When subjected to optical energy (typically 800–1400 nm wavelength depending on the gain medium), these special fibers have atoms excited to their upper lasing level, and when thus excited they are capable of generating or amplifying optical signals. The special fibers providing the gain medium may be easily spliced to regular fibers, which then transmit the optical signals which have been generated or amplified in the gain medium.

A typical fiber amplifier has a source of optical signal coupled to a rare earth doped "special" fiber gain medium. Coupled also to the gain medium is an optical "pump" source to input optical power into the gain medium, and a utilization device to receive an amplified optical signal as output from the gain medium. Referring to FIG. 2, in a typical fiber optic amplification system gain medium 22 is coupled with fiber 12 to permit light signal $P_S$ 11 at wavelength $\lambda_S$ to be amplified when combined with pump light signal $P_P$ at wavelength $\lambda_P$ to provide amplified signal $AP_S$ at wavelength $\lambda_S$ for use by utilization device 14.

Those skilled in the art can appreciate that the more pump power that is coupled into a rare earth doped fiber, the more optical signal output is provided by the gain medium. One form of gain medium 22 is described in PCT Publication WO 96/20519, entitled "A Coupling Arrangement Between A Multimode Light Source and An Optical Fiber Through An Intermediate Optical Fiber Length", wherein a progressively tapered fiber portion is fused to the inner cladding of a double clad fiber carrying an optical information signal in its core. This fused system is shown schematically in FIG. 3 of the present application. However, while the spliced coupling allows the ability to have multiple locations available to input the pump power into a single fiber and achieve power scalability with unrestricted access to both fiber ends, such fused fiber couplers are somewhat difficult to manufacture.

There are various ways to couple pump power into special fiber. In most applications, fiber lasers and amplifiers are end-pumped by single-mode diode lasers whose output is coupled directly into the core of the fiber. The maximum output power achieved with such pumping schemes is currently about 100 mW. This is partly because 100–200 mW is typically the maximum power level that can be coupled into a fiber core at the lowest transverse mode from a readily manufactured semiconductor laser.

However, there are applications, such as for space communications, which require multi-watt levels of pumping. Such higher output powers are generally achieved by using double-cladding fibers. These fibers have a doped single-mode core surrounded by a multi-mode inner cladding that guides pump radiation along the fibers. Typically, the pump radiation is launched into the inner cladding at one of the fiber ends with some kind of coupling optics. The maximum output power of such devices is limited by the brightness of available pump diodes, but tens of watts of output power have been demonstrated at specific wavelengths. The drawbacks of such configurations lie in stringent high-brightness requirements for the pump sources, limited accessibility of fiber ends, and in the difficulties in scaling to higher powers.

Efficient optical pumping of a single-mode fiber laser or an amplifier presents a serious challenge, especially when high output powers are required. Typical end pumping requires high-brightness-pump sources, limits scalability to higher powers, and restricts access to fiber ends, and known side-pumping techniques are difficult to manufacture. Accordingly, there exists a need for an effective, easy to manufacture method and apparatus for use in pumping fiber lasers and amplifiers which provides access to both fiber ends, enables scalability to high output powers, and is relatively straightforward and inexpensive to manufacture.

SUMMARY OF THE INVENTION

The present invention addresses the above-identified needs, providing a method and apparatus to achieve efficient and scalable optical power pumping into a single fiber while allowing unrestricted access to both fiber ends. Moreover, devices embodying the invention may be made for use with either single- or double-clad fibers, and are relatively inexpensive to manufacture.

In accordance with the present invention, a pumping fiber section includes a doped optical fiber core surrounded by a cladding layer having a cladding index of refraction. The pumping fiber section has at least one launch section defined along the fiber and leading lengthwise into an absorptive section, but preferably includes a plurality of such launch sections separated from each other along the fiber by absorptive sections. The launch section(s) are given a convex side and a concave side, and if a plurality of launch sections are used then they are arranged proximate to each other, so that the one or more launch sections form a launch region having a convex side and a concave side.

A launch port having a port index of refraction which matches the cladding index of refraction is given a concave shape to match the convex side of the launch region. The launch port is then mated to the launch section(s) of the launch region. The launch port accepts optical pump power on one or more sides from a pump light source such as a laser diode stripe, and conveys the pump light into the launch section(s) of the doped optical fiber.

The concave side of the launch region is preferably in contact with a solid substrate which supports the shape and provides a surface having a lower index of refraction than that of the cladding. Many variations are possible for this concave side of the launch region, such as providing a support block with a low index surface, or using air or a low-index coating on that side.

In accordance with some preferred embodiments of the present invention the launch port guides light into the fiber coil from two directions. In one preferred embodiment, two diode stripes are provided, and appropriate optics direct light from each diode stripe into one of two sides of the launch port, which is generally trapezoidal in section.

In another preferred embodiment, a single diode stripe and optics direct light into a single side of the launch port, but residual light re-emerging from the fiber into the launch port is reflected back into the fiber using suitable reflection from another surface of the launch port.

In another preferred embodiment, one side of the launch port is transmissive at a first wavelength and reflective at a second, while another side is conversely transmissive at the second wavelength and reflective at the first wavelength. As a result, pump light may be guided into the launch port from two directions, while residual light from each source is reflected back into the fiber to enhance efficiency.

In yet another preferred embodiment, pump light from two laser diode stripes is first polarized transversely to each other, and is then combined in a beam-splitting device so that the input optical power is nearly doubled. The optical power thus obtained is delivered to one entry face of the launch port. In another preferred embodiment, optical power from a similar arrangement using two additional laser diode stripes may be delivered to the opposite side of the same launch port. In yet another preferred embodiment, two such combined sources providing light at two different wavelengths may be directed into two faces of a launch port, and each launch port face may be conductive at one of the wavelengths and transmissive at the other to form a high-power and efficient pumping mechanism.

BRIEF DESCRIPTION OF THE DRAWINGS

FIG. 4 is a side view of a double-clad doped fiber embodiment of the present invention.

FIG. 5 is a side view of a single-clad doped fiber embodiment of the present invention.

FIG. 6 is a top schematic view of the embodiment of FIG. 5 with dual pump light sources.

DETAILED DESCRIPTION

Figure 1:
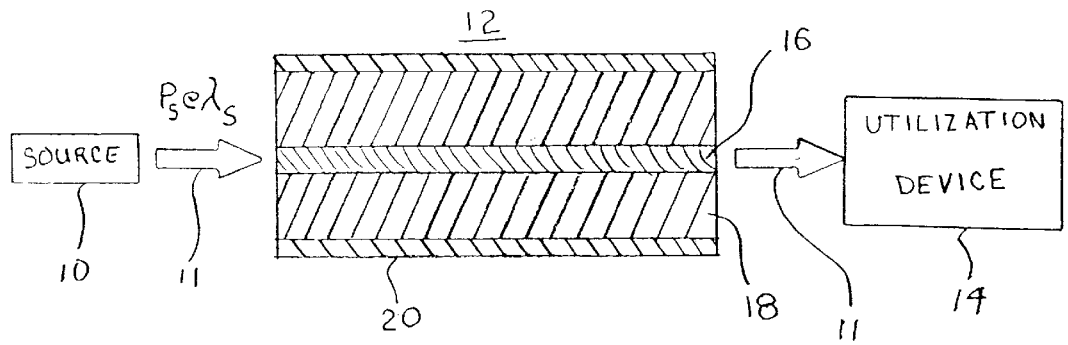
FIG. 1 is a cross-section of a prior art optical fiber, light source and utilization device.
Figure 2:
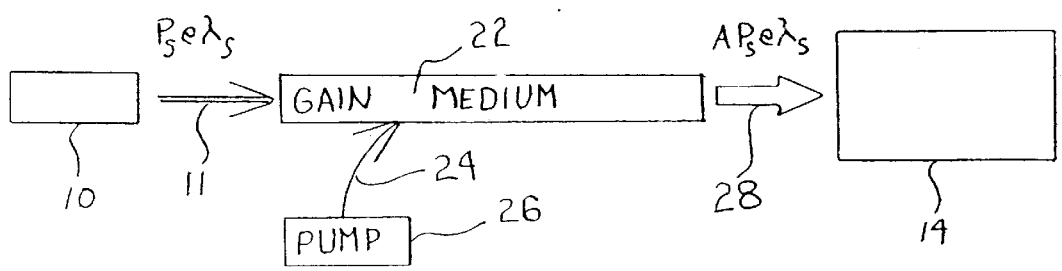
FIG. 2 shows in schematic form a fiber optics system of the prior art wherein a fiber, light source and utilization device has a gain medium employing an optical pump.
Figure 3:
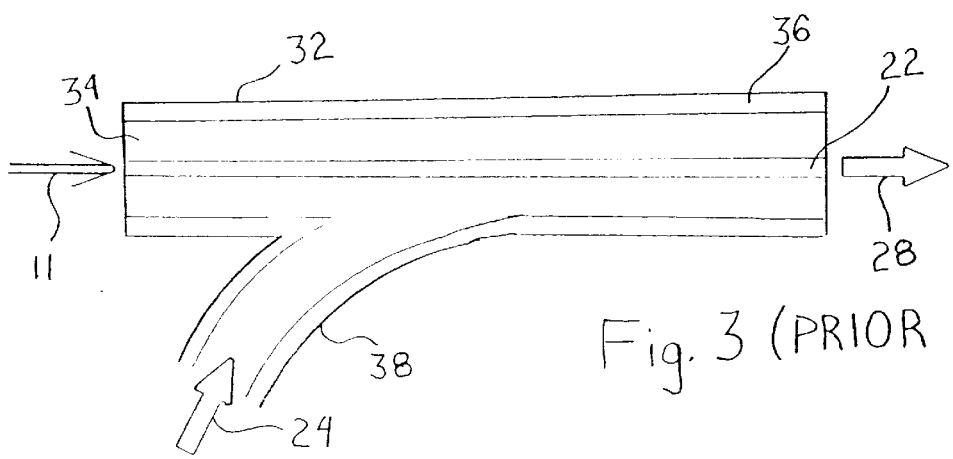
FIG. 3 represents a tapered pump fiber connection to an information carrying fiber.

The present invention preferably utilizes a rare earth-doped fiber as an active gain medium of the fiber laser or amplifier. Doped fiber 41 is arranged into coils as shown in FIG. 4 for one preferred configuration. Doped fiber 41 is preferably cladding pumped (CP) fiber, with inner cladding 40 having a rectangular cross-section; the active medium core is not shown in FIG. 4. Outer cladding 42 is stripped off in the vicinity of launch port 44 and support block 46. The stripped sections of the fiber are placed tightly adjacent on support block 46 (with an intervening substrate, if needed, as discussed later) to form an upwardly convex launch region thereupon. Launch port 44 is preferably shaped to match the contours of the upwardly convex fibers in the launch region, and then disposed and mated thereupon, as will be seen more clearly in FIGS. 7 and 8 which show detail area 48. Launch port 44 has a first pump light entry face 43, and may have a second pump light entry face 45. Except in the vicinity of detail area 48, the depiction in FIG. 4 of coils of doped fiber 41 is merely schematic, and the coils need not be particularly arranged.

Support block 46 may impose the fiber shape in the launch region. Inner cladding 40 typically is made of fused silica, $n_{cl}$=1.45. In that case, to minimize losses in inner cladding 40 due to outer cladding 42 being stripped away above the support block, it is preferred that inner cladding 40 contact a low index substrate material, such as Dupont Teflon™ AF1600 ($n_s$~1.3) or $MgF_2$ ($n_s$~1.373). A thin layer of AF1600, for example, will form such substrate when applied to a support block 46 made of any compatible material. Alternatively, the entire support block 46 may be made of a low index polymer such as $MgF_2$, and no further substrate is then needed. Indeed, support block 46 is optional. The concave side of the launch region may be left simply contacting air, or covered by a low-index coating if touching must be tolerated.

FIG. 5 shows an alternative embodiment of the present invention utilizing single-clad doped fiber 50 which preferably has a rectangular cross-section. In this embodiment single-clad fiber 50 may be wound tightly on support cylinder 56. It should be noted that the support may have a non-cylindrical shape, such as oval or eccentric, which permits varying the loop length independently of the launch region curvature. It is primarily necessary to establish a proper curvature in the launch region in detail area 48, so that launch port 44 will properly mate to the sections of fiber 50 upon which launch port 44 is disposed, as described in more detail with regard to FIGS. 7 & 8.

Figure 13:
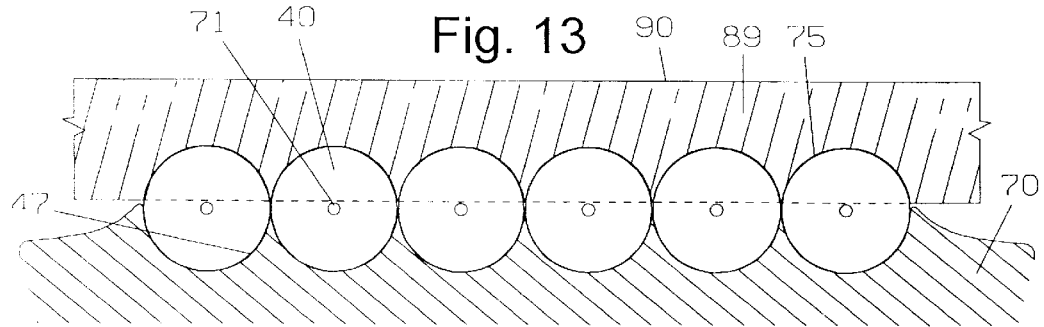
FIG. 13 is a cross-section of the launch port interface using a circular fiber.

It is preferred that fiber 50 have a rectangular cross-section in order to readily mate to the surface of support block 46 above the substrate. However, there are times when it will be convenient to utilize circular cross-section fiber 50. In this case, if support block 46 is used it will preferably be adapted to mate to the lower semicircular portion of the circular fiber 50 cross-section. This may be accomplished, for example, by applying an optical glue (available from, e.g., Nye Optical Products of Fairhaven, Mass.) matching the low index substrate 70 (e.g. Dupont AF1600) before fiber 50 is disposed upon support block 46. Alternatively, and as shown in FIG. 13, a low-index substrate 70 of a material more viscous than AF1600 can be applied to support block 46, and fiber 50 may be disposed upon this substrate while the material is still compliant so that it conforms to fiber 50. As a further alternative, support block 46, whether coated with low refractive index material such as AF1600 or formed from a low refractive index material such as $MgF_2$, may be machined to provide a conforming shape upon which to dispose fiber 50. The support block may be omitted, if structural requirements permit, with the concave side of the launch region contacting air or a low-index coating.

FIG. 6 is a top view of the embodiment of FIG. 5. Launch port 44 covers a plurality of launch sections of doped fiber 50, which is wrapped around support 56. Lens 62 schematically represents optics to focus the light from diode stripe 66 onto launch port 44, and similarly lens 64 represents the optics to focus the light from diode stripe 68 onto launch port 44. It can be seen that the launch sections of fiber 50 are best arranged laterally adjacent each other so as to maximize the efficiency of light transfer from diode stripes 66, 68 into the cladding of fiber 50.

Figure 7:
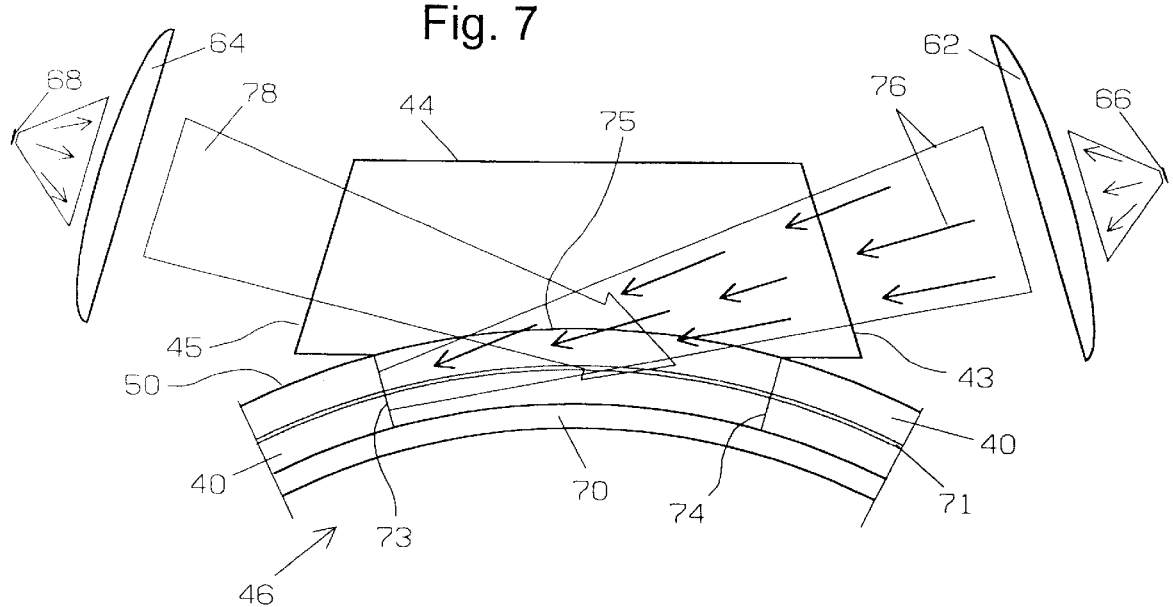
FIG. 7 is a detail view of the launch port area of the embodiment of FIG. 4.

FIG. 7 shows, in side view, detail area 48 as referenced in FIGS. 4 & 5. The trapezoidal cross section of typical launch port 44, including pump light entry faces 43 and 45, can be more clearly seen. Low index substrate 70 is used in this embodiment above support block 46, which accordingly may be formed from a wide range of materials, so long as they are dimensionally stable at operating temperatures and are compatible with the substrate material used (e.g. Teflon™ AF1600). Fiber core 71 is doped with rare-earth elements to form the gain medium. In the preferred embodiment, the bottom of launch port 44 is contoured to fit fiber 50, so that launch port 44 mates with cladding 40 of fiber 50 at interface 75. Other mating geometries are possible; for example, cladding 40 may be polished flat, and the launch port interface 75 may be flat to match. In this embodiment, pump light entry faces 43 and 45 are preferably shaped perpendicular to the direction of the pump beam propagation, and given an anti-reflection (AR) coating.

The launch port has a port index of refraction which matches the cladding index; both port and cladding are preferably fused silica. The launch port may be attached to the fibers in the launch region by gluing, optical contact, or diffusion-bonding. When power densities are not excessive, low-absorption optical glue having an index of refraction matched to that of the cladding and launch port may be used (available commercially from e.g. Nye Optical Products of Fairhaven, Mass.). For higher power embodiments which are not subject to excessive vibration, optical contact may be used. Diffusion bonding may also be used for higher power, but has special design issues because the high temperatures needed for diffusion bonding are not compatible with Teflon™ AF1600, nor with the outer cladding of most double-clad fibers.

The light from first diode stripe 66, seen here in end section, is gathered by first optics 62 to form first pump beam 76, which traverses first pump light entry face 43 to focus upon first diode image plane 73, and is thus reasonably well aligned within fiber cladding 40 after traveling through launch port/cladding interface 75. Second diode stripe 68 pumps light through second optics 64 to form second pump beam 78, which traverses second pump light entry face 45 and interface 75 to focus on second diode image plane 74, well aligned with cladding 40 in a direction opposite that of first pump beam 76. The pump power launched into fiber inner cladding 40 propagates along fiber 50, being absorbed in the process by rare-earth dopants in core 71. It is desirable that all pump power is absorbed, since this maximizes the device efficiency. However, pump radiation remaining after one round trip in the fiber will experience losses at the launch port, re-emerging into port 44. Two general approaches are presented for minimizing such losses in order to increase the efficiency of the system. In a first approach, fiber loops long enough to absorb most of the pump light are employed, as discussed below. In a second approach, the launch port is modified to reflect, back into fiber 50, that light which re-emerges into the launch port after traveling through an absorptive section, as discussed further below with respect to FIGS. 8 and 9.

Absorption through Loop Length

One means to achieve good pump light absorption is to select sufficient loop length for doped fiber 41. The loop length of doped fiber 41 (FIG. 4) is preferably chosen such that 90% of pump power is absorbed per round trip. As an example, consider an Er/Yb—doped double cladding fiber amplifier operating at 1.55 $\mu$m in the embodiment shown in FIGS. 4 and 6. Pump absorption length (1/e) in the core $l_{co}$=0.7 cm at 980 nm and 2.1 cm at 920 nm, respectively. The pump absorption length in the cladding is scaled by the ratio of the cladding and core areas $A_{cl}/A_{co}$, i.e., $l_{cl}=l_{co}A_{cl}/A_{co}$. Assuming 8 $\mu$m core diameter and 80 $\mu$m rectangular cladding, $l_{cl}$=89 cm and 267 cm for 980 nm and 920 nm pump radiation, respectively. Therefore, 90% of 980 nm and 920 nm pump is absorbed in 205 cm and 615 cm long fibers, respectively. In high power applications, shorter fiber length is often desirable, since it reduces the chances of developing parasitic nonlinear effects. It may be seen from the above that reducing the ratio of cladding to core areas $A_{cl}$,$A_{co}$ will permit the overall fiber length to be reduced. Preferable loop lengths for other gain mediums and pump light wavelengths may be calculated in a similar manner. Although 90% absorption is preferred, tradeoffs between absorption efficiency and parasitic losses may suggest that shorter lengths be used; and if parasitic losses are small, then exceeding the 90% absorption length may be useful.

Recycling Escaping Pump Light

Figure 8:
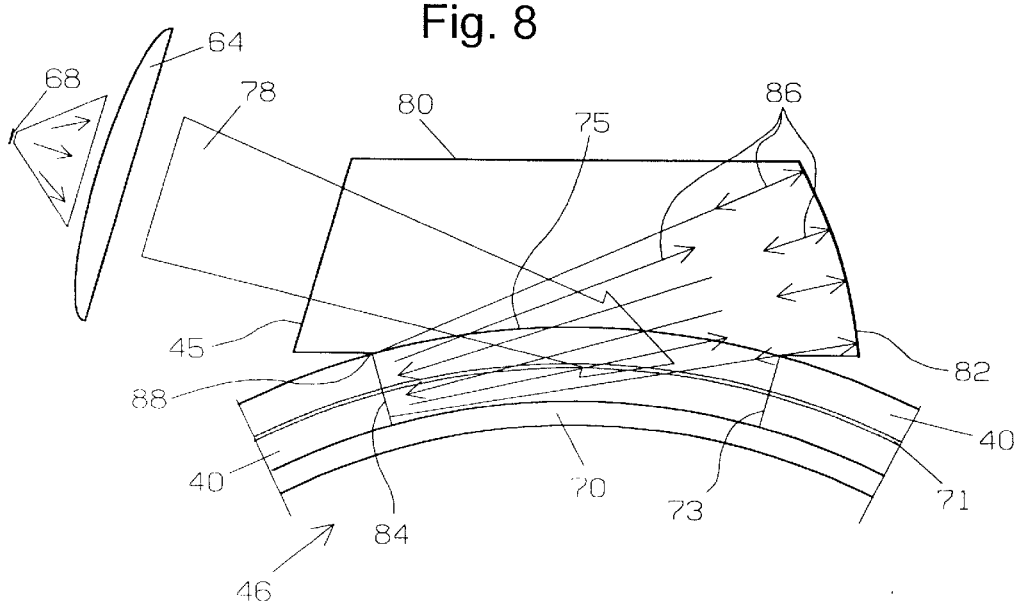
FIG. 8 is a single-source, return reflecting embodiment of the FIG. 7 launch port.

It may sometimes be difficult, for some wavelength and gain medium combinations, to provide adequate loop length to absorb the bulk of the pump light within a single round trip. This is a particular problem for the configuration shown in FIG. 5, because there the diameter of the support cylinder is practically limited to tens of centimeters and thus the loop length is proportionally limited. FIG. 8 shows an alternative approach to enhance coupling efficiency, reducing losses at the port by redirecting escaping pump light back into the fiber. In FIG. 8, pump light is provided from diode stripe 68 as pump beam 78 into one side (45) of the launch port. Light 86 escaping the fiber after completing a trip around the fiber is returned to the fiber by means of mirror 82 placed on the other side of the port, opposite side 45. Mirror 82 replaces the second pump light entry face to create single-entry launch port 80. Mirror 82 is made by polishing a spherical surface on one side of the port and depositing a reflecting coating onto it. Output plane 84 of fiber 50, which crosses the fiber at the right angle at edge 88 of interface 72 between launch port 80 and fiber cladding 40, is imaged back onto itself by mirror 82. Thus, residual pump light 86, emerging into the launch port from fiber self-image plane 84, is reflected back into cladding 40.

Figure 9:
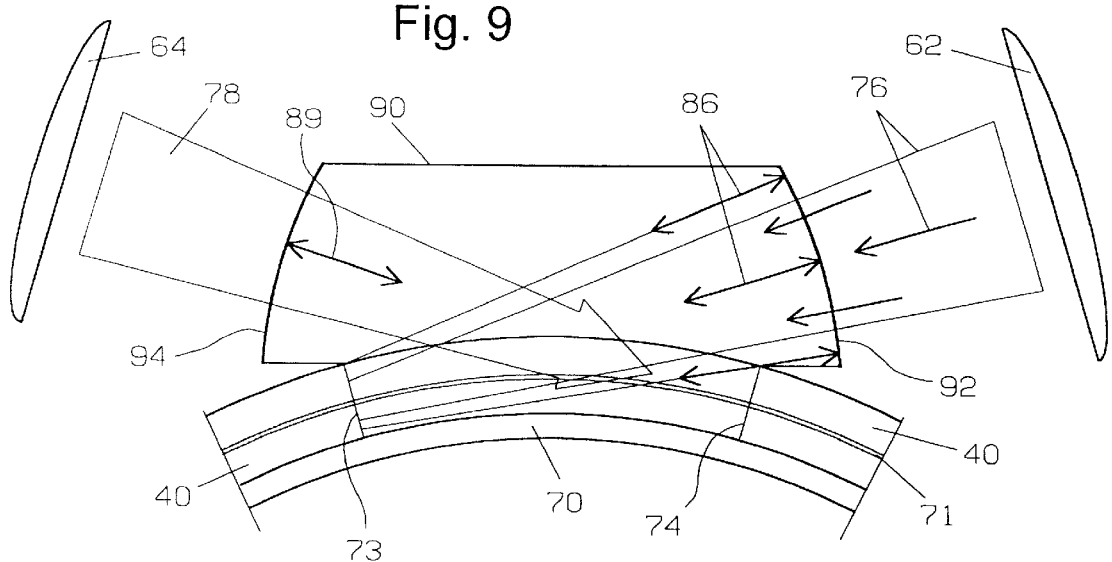
FIG. 9 is a two wavelength, dual source, conductive/reflective launch port.

FIG. 9 shows an embodiment employing the principles of both FIG. 7 and FIG. 8, utilizing a two-sided launch port which also reflects, back into the cladding, light which is re-emerging into launch port 90 after a round trip through an absorptive fiber loop. First pump beam 78 having a first wavelength $\lambda_1$ (which may be 915 nm, for example) is provided and focused through optics 64 and launch port 90 into fiber cladding 40 at focal plane 74. Pump light which remains unabsorbed after one round trip through fiber cladding 40 may emerge back into launch port 90 beginning at plane 73 (where launch port 90 mates to fiber cladding 40) as escape light 86, still at $\lambda_1$. A first transmissive/reflective coating is provided on launch port face 92 to reflect light of first wavelength $\lambda_1$ back into fiber cladding 40. This first coating also transmits light of second wavelength $\lambda_2$ (925 nm, for example) which is input from a source, through optics 62, as second pump beam 76. Such coatings, transmissive at a first wavelength and reflective at a second, are well known in the art.

Launch port entry face 92 is thus transmissive for light of $\lambda_2$ and reflective for light of $\lambda_1$, while the coating of launch port entry face 94 is transmissive to light of $\lambda_1$ but reflective to light of $\lambda_2$. Therefore, residual light 89 at $\lambda_2$ from pump beam 76 which re-emerges into launch port 90 after traveling around a loop of fiber will be reflected by launch port face 94 back into cladding 40, while residual light 86 will be reflected by face 92.

Ytterbium is a preferred rare-earth dopant for the embodiment shown in FIG. 9 due to its broad absorption band which enables it to efficiently absorb pump light at wavelengths differing by at least 10 nm, e.g. 915 vs. 925 nm. It is possible to use the same approach using other dopants, such as erbium, though erbium's narrower absorption band will make it more difficult to prepare a coating which is transmissive at one wavelength and reflective at a second, if both wavelengths are close enough to be efficiently absorbed by the erbium dopants. Another approach is to combine two different dopants in the fiber cladding, for example erbium and ytterbium, and provide one pump light source at the absorption center of each. The coating of one launch port entry face would thus transmit light having a wavelength centered at the absorption peak of erbium, and reflect light with a wavelength absorbed by ytterbium, while the coating of the other launch port entry face would behave conversely. By the same principle, the two pump sources may provide light at two different absorption peaks of the same dopant.

Geometry of Launch Port, Pump Source and Optics Versus Optical Power Transfer

The total optical power input to an optical fiber by the launch port is affected by the geometry of the pump light source and the port, as well as its efficiency.

The overall fiber length is the product of the length of absorptive sections (plus a small launch section) by the number of such absorptive sections or "turns". The number of turns is determined by matching the useful width of the launch port to the desired pump source 66, 68. The launch port useful width is determined by the total width of adjacent fibers, rather than by the width of the trapezoidal block bonded to the fibers, which may be enlarged for manufacturing convenience. Consider a 400 micron long single-stripe diode source emitting 3 W, such as is readily available commercially. Cylindrical optics 64, 66 with M=1 magnification in the stripe direction may be used for coupling the pump power into launch port 44, which therefore should be at least 400 microns wide. A typical square cross-section inner cladding is 80 $\mu$m on a side. Five adjacent 80 $\mu$m fiber loops add to generate a total length of 400 $\mu$m, matching the source diode. In this configuration, a total 10.3 m fiber length is preferred if 980 nm pumping is chosen. Other lengths of stripe diodes are available; indeed, 10,000 micron long diodes are presently manufactured as a sequence of end-to-end diodes. Such longer diodes will generally have higher power output, and can accommodate a larger number of fiber turns.

To determine the appropriate magnification of the optics for the direction perpendicular to the source diode stripe, numerical aperture of the cladding beneath the launch port, $NA=(n_{cl}^2-n_s^2)^{1/2}$, should be considered so that the pump beam is captured by the cladding. It is always advantageous to have maximum possible numerical aperture, since it can accommodate beams of inferior quality or, alternatively, permit more efficient launch port geometry which reduces power scattering of the non-absorbed portion of the pump beam. Maximum numerical aperture is achieved by using substrates (see FIGS. 7, 8) having the lowest refraction index, e.g., those covered with Teflon™ AF1600. Since this substrate is not compatible with some assembly techniques, such as diffusion bonding, consider first a less optimal substrate, e.g. a support block 46 made of $MgF_2$, which has a relatively high refraction index.

For fused silica cladding on a $MgF_2$ substrate, NA=0.45, which is somewhat less than the NA~0.5 of the diode bars in the direction perpendicular to the stripe. Therefore, magnification M>1.1 should be used for this direction. However, at this magnification the focal spot width of the beam is not much greater than the width of the diode stripe, typically about 1 micron, while the cladding into which the beam is focused is typically about 80 microns wide. There is thus a great deal of room to increase the focus spot size, permitting the use a larger magnification, e.g. M=5. Such a larger magnification reduces the NA of the pump beam at the launch port, thereby reducing system losses. Below, we assume M=5, which results in NA=0.1 for the pump beam at the port.

The height H of the trapezoidal launch port should be large enough to accommodate the whole beam at the pump light entry faces, which results in the restriction H>2 NA L/2n, where L is the overall length of the trapezoid, and n is the refraction index of the launch port material. For H=1 mm, this gives L<10 mm. The length L of the longest side of the trapezoid cross-section of launch port 44 should exceed the length l spanning the physical contact along interface 75 between launch port 44 and the fiber launch section(s). If the radius of the launch sections is R=10 cm, and the launch port is shaped to accept the launch section(s) to a depth d=30 $\mu$m, one gets length l of interface 72 contact=$2(2 R d)^{1/2}$=4.9 mm, which is less than the maximum L determined above. If the launch sections have a smaller radius, or are mated with the launch port to a shallower depth, then the length of the launch block may be correspondingly reduced, which may result in smaller scattering losses.

Increasing Optical Power Input

Figure 10:
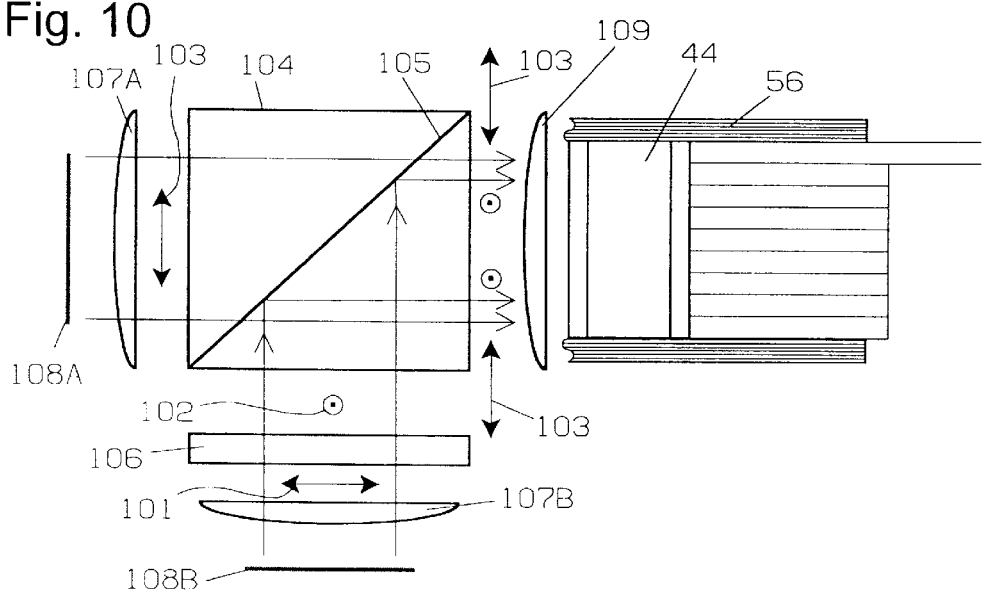
FIG. 10 depicts combining two pump sources for one launch port entry face.

FIG. 10 shows an approach for increasing the light coupled into fiber cladding 40 by a polarized combination of two source beams. Polarizing beam-splitting cube 104 directly transmits light from pump diode stripe 108A which is collimated by optics 107A and is polarized as shown by indication 103. Diode stripe 108B provides light polarized as shown by reference 101, which polarization is then shifted by polarization half-wave plate 106 such that the polarization of the light emerging from half-wave plate 106 is as shown by reference 102. The light thus polarized is reflected 90 degrees by polarizing beam-splitting cube 104, such that it emerges in the same direction as the light from diode 108A. Before entering launch port 44 (shown on support cylinder 56), the combined beams (polarized perpendicularly to each other) are refocused by lens 109.

Figure 11:
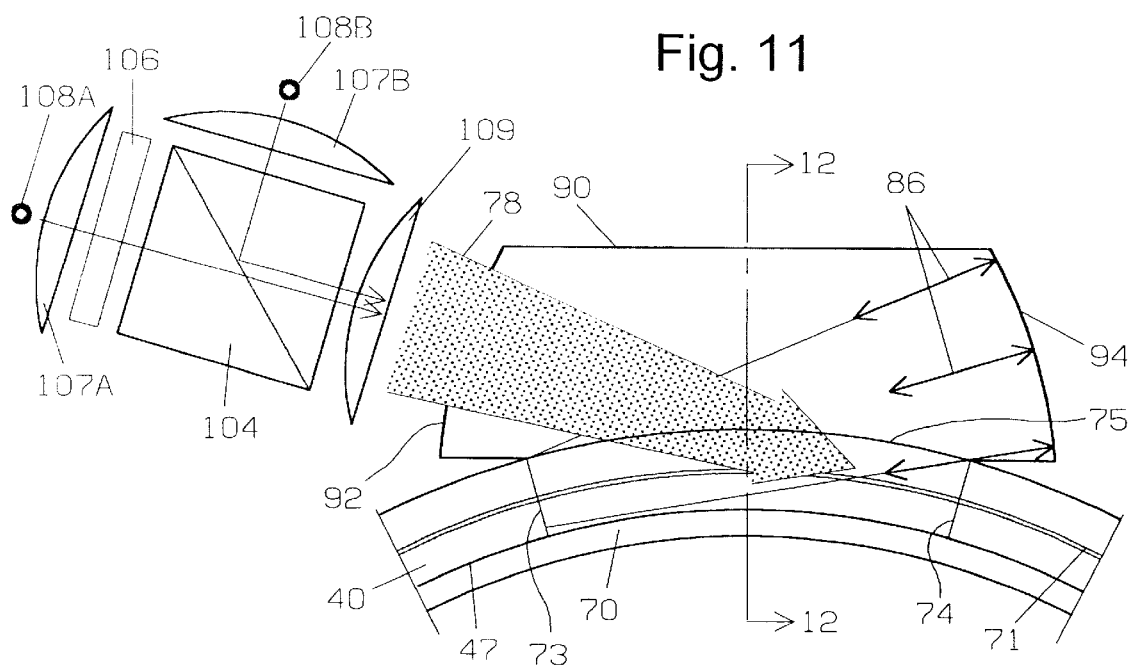
FIG. 11 shows an alternative polarizing combination of two pump sources.

Variations are possible on the approach shown in FIG. 10. For example, FIG. 11 shows diode stripes 108A and 108B oriented parallel to each other (perpendicular to the page), which is also parallel to the width of launch port 90. Polarizing beam splitter 104 is then elongated to form a rectangular parallelpiped which extends at least the length of diode stripes 108A and 108B. Collimating lenses 107A and 107B, and polarization half-wave plate 106, perform the same functions as in FIG. 10. The combined pump light from diode stripes 108A and 108B form beam 78. FIG. 11 shows beam 78 entering fiber cladding 40 only through face 92 of launch port 90 to focus on focal plane 74. After traveling a loop of the fiber, residual light 86 re-entering launch port 90 at intersection plane 73 will be reflected from face 94, which is reflectively coated.

The combining of beams shown in FIG. 11 may be used with a launch port 90 as shown in FIG. 9 to effectively input the light from four pump diodes into fiber cladding 40. In this case, output power of the device may be estimated by assuming that the output of two 3 W diodes is combined with polarization coupling at each end of the launch port, thereby bringing the total available power to 12 W, less the inevitable losses. With 80% coupling efficiency, in excess of 9 W of pump power is coupled, and in excess of 8 W is actually absorbed by the active medium. Typically, 40% conversion efficiency is anticipated for an Er/Yb amplifier, resulting in more than 3 W output from a single amplifier stage. If more power is required, several stages may be employed with Faraday isolators spliced in between.

Mating of Launch Port and Fiber

Figure 12:
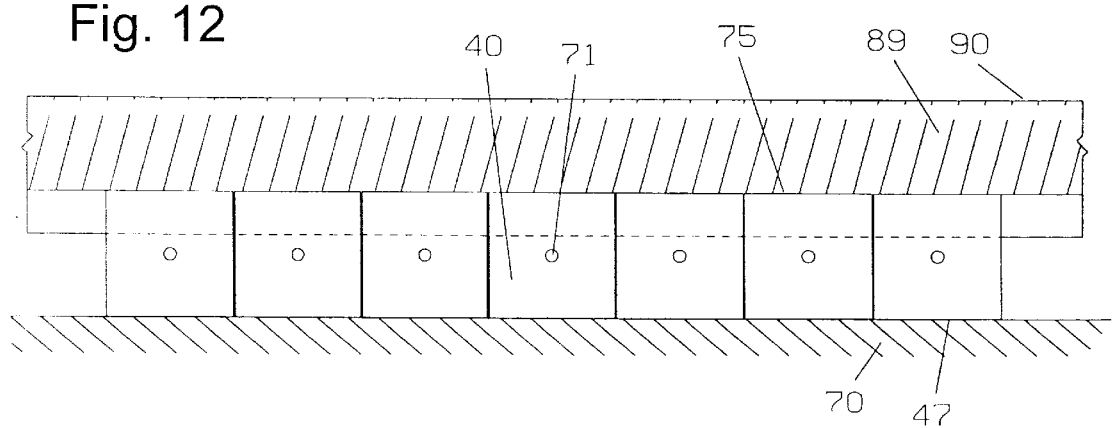
FIG. 12 is a cross-section of the launch port interface using a rectangular fiber.

FIG. 12 is a cross section of FIG. 11 (or any other port embodiment) emphasizing the interface between adjacent launch sections (shown with seven such sections) of a fiber having an inner cladding 40 with rectangular cross-section around doped core 71. Material 70 on the concave side of the launch region may be a support block 46, or a substrate on a support block, or simply air or a low-index coating. Interface 47, between material 70 and the fibers of the launch region, may include index-matching optical glue. The launch sections are closely adjacent each other. Material 89 of launch port 90 mates to the launch region along interface 75, which may include index-matching optical glue. The dotted line shows the bottom of launch port 90 where the launch region no longer intrudes. Since the cladding thickness is constant, each point of interface 75 is essentially plane-parallel to the corresponding point of interface 47.

FIG. 13 shows the same interface using a fiber of circular cross section. Material 89 effectively conforms to cladding 40 of the adjacent fibers, which may be effected, for example, by machining launch port 90, preferably in conjunction with index-matching optical glue along interface 75. Material 70 may be, for example, a combination of optical glue on a substrate, or may be an optical material which compliantly conforms to interface 47. Material 70 need not be solid to provide physical support, but may be air, or simply a low-index coating.

The present invention has been described in its preferred and alternative embodiments. It must be noted that each embodiment is further functional with a wide range of length for pump source diode, at least from 200 micron to 10,000 micron long. Moreover, the invention may be practiced with a wide range of gain mediums as are now or may become known in the art, and with a wide range of fiber sizes and materials. It is readily scalable to higher or lower powers, and is susceptible to numerous modifications and embodiments within the ability of those skilled in the art. Thus, it should be understood that various changes in form and usage of the present invention may be made without departing from the scope of this invention, and the invention is accordingly defined only by the claims which follow.

What is claimed is:

1. A method of pumping an optical fiber comprising the steps of:

providing a special optical fiber having a core and having a first cladding layer of a material with a first cladding index of refraction, the fiber having a gain medium for absorbing optical pump light;

defining at least one launch section of the special optical fiber followed lengthwise by an absorption section thereof;

forming said at least one launch section into a launch region having a convex side and a concave side, the concave side of said at least one launch section contacting a substrate material having a substrate index of refraction less than the first cladding index of refraction;

shaping a launch port to match the convex side of said at least one launch section of the launch region;

mating the launch port with the at least one launch section of the launch region over a mating surface; and directing pump light from a pump light source through optics into an entry face of the launch port, the launch port substantially conducting the pump light into the first cladding of the at least one launch section.

2. The method of claim 1 including the further step of providing a support block which presents the substrate material as a convex surface on the support block.

3. The method of claim 2 wherein the convex surface on the support block is separated from the mating surface of the launch port by a substantially constant thickness of the at least one launch section.

4. The method of claim 1 wherein the mating surface of the launch port conforms to a rounded outer shape of the first cladding layer of the at least one launch section.

5. The method of claim 1 wherein the step of defining at least one launch section of the special optical fiber includes defining a plurality of launch sections, each launch section being separated, lengthwise along the special optical fiber, from another launch section by an absorption length of the special optical fiber.

6. The method of claim 4 wherein the plurality of launch sections each have a length, and including the further step of disposing each of the launch sections substantially adjacent another launch section along its length.

7. The method of claim 5 including the step of gluing the launch port to the launch sections at the launch region.

8. The method of claim 5 including the step of diffusion bonding the launch port to the launch sections at the launch region.

9. The method of claim 5 including the step of supplying a pump light beam from a diode stripe having an emitting area which is more than 150 microns long.

10. The method of claim 1 including the step of stripping the special optical fiber down to the inner cladding in the launch region.

11. The method of claim 1 wherein the substrate material is air.

12. The method of claim 5 wherein a cross-section of the first cladding of the special optical fiber is rectangular.

13. The method of claim 1 wherein the special optical fiber has double cladding.

14. The method of claim 5 including the further steps of supplying a second pump light beam and interposing second optics to direct the second pump light beam into a second face of the launch port.

15. The method of claim 5 wherein said face is a first face, and including the further step of causing a second face of the launch port to reflect light emerging into the launch port from the special fiber back into the special fiber.

16. The method of claim 15 wherein said second face is reflective of a first wavelength of pump light and admits a second wavelength of pump light into the launch port.

17. The method of claim 16 wherein said first face is transmissive of said first wavelength of pump light and reflective of said second wavelength of pump light.

18. The method of claim 5 including the step of providing pump light from two separate pump light sources into said face.

19. The method of claim 18 including the steps of polarizing light from each pump light source orthogonally to the other, and combining the pump light from two sources into a single beam by a polarizing beam splitter before directing the beam into the launch port.

20. The method of claim 18 wherein light from third and fourth pump light sources is combined and directed through a second face of the launch port into the special fiber.

21. A device for pumping light energy into an optical fiber, comprising:
   a special optical fiber having
      a gain medium for absorbing optical pump light;
      a first cladding layer having a cladding index of refraction; and
      at least one launch section and an absorbing section;
   a launch region including each launch section, with a concave side where first cladding of each launch section optically contacts transparent material having a refraction index lower than the cladding index of refraction, and having a corresponding convex side;
   a pump light source providing a beam of pump light through optics; and
   a launch port having an index of refraction substantially matching the cladding index of refraction, being shaped to match the convex side of the launch region and optically mated thereto along a port mating surface, and having a light-entry face accepting light from the pump light source for guiding into the first cladding layer of the special optical fiber.

22. The device of claim 21 where in said at least one launch section is a plurality of launch sections, each launch section separated axially along the special optical fiber from another by an absorption section of the special optical fiber, each launch section disposed adjacent another to form the launch region, and wherein the launch port is optically mated to all of the launch sections along the port mating surface.

23. The device of claim 22 wherein the first cladding of the special optical fiber has a rectangular cross section, and wherein the port mating surface is at each point substantially plane parallel and constantly distant from corresponding points of a contact surface between the transparent material and the launch region concave side.

24. The device of claim 22 wherein the first cladding of the special optical fiber has a circular cross section, and wherein the port mating surface includes material conforming to the first cladding of the launch sections of the launch region.

25. The device of claim 22 wherein the launch sections of the special optical fiber have no covering outside of the first cladding layer in the launch region.

26. The device of claim 21 wherein the launch port is mated to the at least one launch section of the special optical fiber in the launch region with optical glue.

27. The device of claim 22 wherein the launch port is mated to the special optical fiber in the launch region by optical contact.

28. The device of claim 22 wherein each launch section first cladding layer is disposed on a support block which provides the transparent material contacting the concave side of the launch region.

29. The device of claim 28 wherein the special optical fiber is double-cladding fiber and the first cladding is an inner cladding of the double-cladding fiber and has a rectangular cross section, the light-entry face of the launch port is a first face, and the launch port has a second face.

30. The device of claim 29 wherein the second face includes a surface which reflects, back into the first cladding, pump light which has entered the first cladding of the special optical fiber through the light-entry face and re-emerged into the launch port.

31. The device of claim 29 wherein the second face has a surface which transmits pump light from a second pump light source into the launch port.

32. The device of claim 30 wherein the second face has a surface which transmits pump light from a second pump light source into the launch port.

33. The device of claim 32 wherein pump light from the first pump light source has a first wavelength, pump light from the second pump light source has a second wavelength, the second face reflects light at the first wavelength and transmits light at the second wavelength, the first face reflects light at the second wavelength and transmits light at the first wavelength, and said gain medium is absorptive of pump light at said first wavelength and of pump light at said second wavelength.

34. The device of claim 31 wherein each pump light source includes a diode stripe at least 400 microns long.

35. The device of claim 22 wherein said pump light sources includes two source beams polarized orthogonally to each other which are combined into a single beam through a polarizing beam splitter.

36. The device of claim 35 wherein each source beam originates from a diode stripe at least 400 microns long.

37. The device of claim 33 wherein each pump light source includes two source beams polarized orthogonally to each other which are combined into a single beam through a polarizing beam splitter.

* * * * *